United States Patent [19]

Sekine et al.

[11] 3,843,103

[45] Oct. 22, 1974

[54] HEAVY PLATE CUTTING APPARATUS

[75] Inventors: Kazuo Sekine; Michio Mimura, both of Yokohama; Yasuhiko Oniki, Tokyo; Nobushige Koyano, Yokohama, all of Japan

[73] Assignee: Nippon Kokan Kabushiki Kaisha, Tokyo, Japan

[22] Filed: Dec. 18, 1972

[21] Appl. No.: 316,002

[30] Foreign Application Priority Data

Jan. 21, 1972   Japan................................ 47-8142

[52] U.S. Cl.............................. 266/23 M, 266/23 K
[51] Int. Cl............................ B23k 7/02, B23k 7/10
[58] Field of Search.... 266/23 R, 23 K, 23 L, 23 M, 266/23 E

[56] References Cited
UNITED STATES PATENTS

| | | | |
|---|---|---|---|
| 2,107,396 | 2/1938 | Schoitz............................. | 266/23 L |
| 2,373,541 | 4/1945 | Chelborg et al................... | 266/23 M |
| 3,153,109 | 10/1964 | Steventon et al. ................ | 266/23 L |

*Primary Examiner*—Roy Lake
*Assistant Examiner*—Paul A. Bell
*Attorney, Agent, or Firm*—Flynn & Frishauf

[57] ABSTRACT

A plate cutting apparatus equipped with a cutting torch movable in both vertical and horizontal directions, whereby the edge of a heavy steel plate block comprised of a plurality of metal pieces welded together and having its upper surface lying in the same plane is beveled in a manner such that the beveled edge portions are always made to extend in a straight line.

11 Claims, 5 Drawing Figures

HEAVY PLATE CUTTING APPARATUS

BACKGROUND OF THE DISCLOSURE

The present invention relates to a heavy plate cutting apparatus and more particularly to an apparatus of the type whereby when the edge of a steel plate comprised of a plurality of metal pieces welded together and having the upper surface thereof lying in the same plane is beveled by a cutting torch, the beveled edge is made to extend in a straight line.

When a heavy plate comprised of a plurality of metal pieces of different thicknesses which have been welded together in such a manner that the upper surface lies in the same plane and the lower surface lies in different planes since the plates differ in thickness from one part to another (e.g., a heavy ship plate) is subjected to edge preparation with the cutting torch angle being fixed during the bevel cutting operation, the beveled edges of the thin and thick steel plate portions do not extend in a straight line in the same plane. Thus, if a plurality of such heavy plates having such beveled egdes are to be welded together (e.g., if these heavy plates are to be formed into hull blocks which are in turn welded together to construct the frame of a ship), there results a lack of uniformity in the junction lines, thereby giving rise to an interrupted welding operation and particularly a deteriorated efficiency in the case where an automatic welding machine is employed.

With known apparatus of the above type, the operator is required to interrupt the cutting operation from time to time to readjust the positions of the portable rail and the cutting apparatus located above a heavy plate to be cut so that the angular position of the torch can be readjusted according to the thickness of the plate to resume the operation. The result is that it is impossible to ensure a satisfactorily high welding accuracy and the cutting efficiency also tends to be very inferior in such prior art apparatus.

SUMMARY OF THE INVENTION

The foregoing difficulty is overcome by the apparatus of the present invention. A novel feature of the apparatus of the present invention is that the thickness of a plate to be cut is detected so that the cutting torch is moved horizontally or vertically in accordance with detected signals to thereby always keep the beveled edge portions extending in a straight line. When a heavy plate comprised of a plurality of metal pieces of different thicknesses welded together and having the upper surface thereof lying in the same plane is subjected to bevel cutting, the angular position of the torch must be adjusted to keep the beveled edge portions extending in a straight line, and the torch must be moved both in the transverse direction relative to the direction of movement of the cutting apparatus and in the vertical direction with respect to the surface of the plate to be cut.

It is therefore the object of the present invention to provide a heavy plate cutting apparatus which comprises a cutting torch movable both in the vertical and horizontal directions and in which the thickness of a heavy plate of an uneven thickness is detected and the angular position of the torch is adjusted according to the detected thickness to thereby cut the plate in a desirable manner.

DESCRIPTION OF THE PREFERRED EMBODIMENTS

Figure 1:
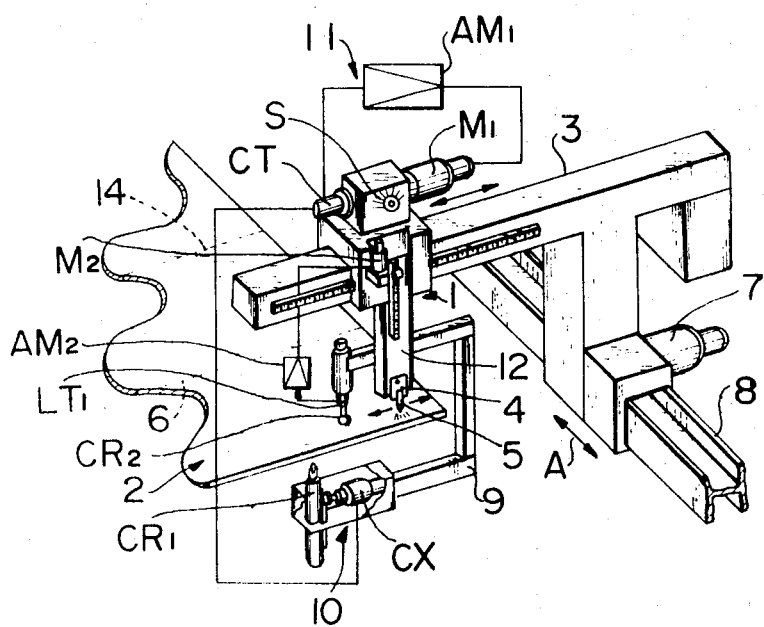
FIG. 1 is a perspective view of an embodiment of an apparatus according to the present invention in which the thickness of a plate to be cut is detected to thereby adjust the position of the torch in the transverse direction.

The present invention will now be explained in more detail with reference to the accompanying drawings. Referring first to FIG. 1, reference numeral 1 designates a floating carriage movably mounted on a carrying beam 3 above a steel plate 2 to be cut, and numeral 4 designates a torch holder supporting a torch 5 mounted thereon. The floating carriage 1 is moved on the carrying beam 3 to adjust the position of the torch 5 and thus to align the beveled edge in spite of variations in the thickness of the plate. The carrying beam 3 is movable by a travel motor 7 in the same direction in which the plate is to be cut. That is, the beam 3 is movable along a rail 8. Broken lines 6 and 14 indicate the junction lines at which smaller metal pieces are welded together, and an arrow A indicates the direction in which the heavy plate is to be cut.

As previously mentioned, a complicated problem that arises when the steel plate 2 is subjected to edge preparation with the arrangement described above is the necessity of aligning the beveled edge to extend in a straight line. This difficulty is overcome by the novel arrangement of the present invention which will be explained hereunder.

The floating carriage 1 is provided with a floating arm 9 which extends below the lower surface of the plate and the plate thickness detector 10 is mounted at the upper end of the floating arm 9. The detector 10 comprises a detecting roller $CR_1$ and a synchro control transmitter CX linked to the detecting roller $CR_1$. The detecting roller $CR_1$ is always urged into close contact with the lower surface of the plate by a spring, so that when any variation in the thickness of the plate during the bevel cutting operation causes the detecting roller $CR_1$, to move in the vertical direction, there results a variation in the declination of the synchro control transmitter CX.

The output signals of the detector 10 are supplied to a control device 11 for controlling the position of the torch and thus the torch 5 is controlled according to the output signals (variations in the plate thickness) to move the torch 5 in the transverse direction with respect to the direction of movement of the torch 5 during cutting to thereby keep the beveled edge portions extending in a straight line. The control device 11 comprises, for example, a synchro control transformer CT, an amplifier $AM_1$, a motor $M_1$ and a torch displacement setting device S (a kind of stepless speed change gear).

When the declination of the synchro control transmitter CX changes so that there results a difference in declination between the synchro control transmitter CX and the synchro control transformer CT, the synchro control transformer CT generates an output voltage which is in turn amplified in the amplifier $AM_1$ and then applied to the motor $M_1$ to operate it. When the motor $M_1$ is thus put into operation, the floating carriage 1 is caused to travel on the carrying beam 3, thereby moving the torch 5 in the transverse direction and at the same time causing the synchro control transformer CT to operate until the angular difference between it and the synchro control transmitter CX is reduced to zero.

Figure 2:
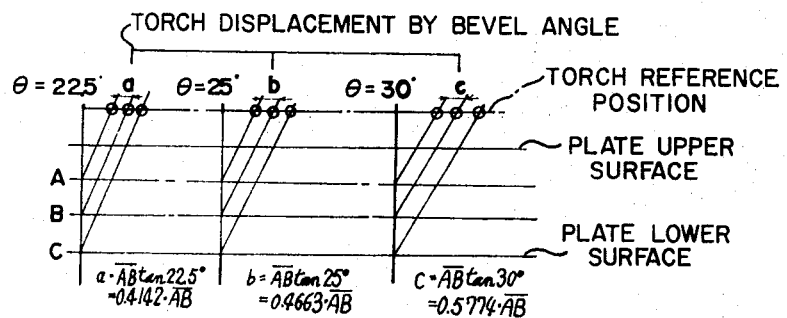
FIG. 2 is a diagram showing the amounts of displacement of the torch, which is useful for explaining the operation of the apparatus shown in FIG. 1.

When the angular difference is reduced to zero, the motor $M_1$ is stopped rotating and hence the transverse movement of the torch 5 is stopped. In this case, as will be seen from FIG. 2, if $\theta$ denotes the angle of bevel, then the amount of transverse displacement of the torch 5 is given in terms of a differential plate thickness multiplied by $\tan \theta$. Thus, as shown at $a$, $b$ and $c$ in FIG. 2, even for the same differential plate thickness $\overline{AB}$, the amounts of transverse displacement of the torch 5 must be varied according to different bevel angles. Accordingly, the amounts of displacement are predetermined by the torch displacement setting device S to preset the degrees of rotation (the amounts of transverse displacement of the torch) of the motor $M_1$ in relation to the output voltages of the synchro control transformer CT. In this manner, the beveled edge can be aligned to extend in a straight line in spite of variations in the thickness of a plate to be cut.

In the torch control operation described above, if the steel plate 2, owing to distortion therein, is not perfectly paralleled on the same level with the surface of the rail 8, then the detecting roller $CR_1$ may be caused to operate even in the absence of any variation in the thickness of the plate, resulting in a transverse movement of the torch 5. In order to overcome this problem, a floating plate 12 forming a part of the floating carriage 1 is adapted so that it is movable in the vertical direction and the floating plate 12 is also attached to the torch holder 4 and the floating arm 9 having one end thereof extending below the lower surface of the steel plate 2. It is also preferable to mount, at the other end of the floating arm 9, a differential transformer $LT_1$ having a detecting roller $CR_2$ placed in contact with the upper surface of the steel plate 2 as shown in FIG. 1, so that each of the torch 5 and the detecting roller $CR_1$ is always maintained at a predetermined distance from the upper surface of the plate 2 in accordance with the output of the differential transformer $LT_1$. In other words, when the upper surface of the steel plate 2 is not in parallel with the rail 8, the differential transformer $LT_1$ is actuated with a resultant change in its output voltage. The output voltage is then amplified in an amplifier $AM_2$ and applied to a motor $M_2$. Consequently, the motor $M_2$ moves the floating plate 12 and hence the torch holder 4 in the vertical direction until the differential transformer $LT_1$ returns to the zero position. In this manner, the torch 5 as well as the detecting roller $CR_1$ can be maintained at a predetermined distance from the upper surface of the steel plate 2.

Figure 3:
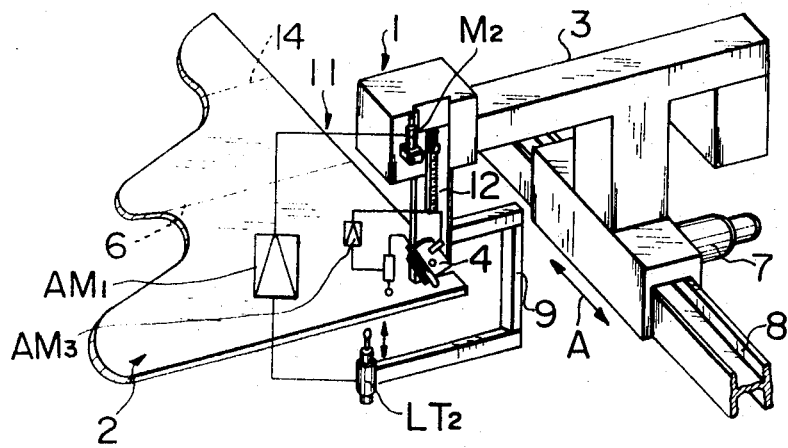
FIGS. 3 and 4 show another embodiment of the apparatus of the present invention in which the thickness of a plate to be cut is detected to thereby adjust the position of the torch in the vertical direction.
Figure 4:
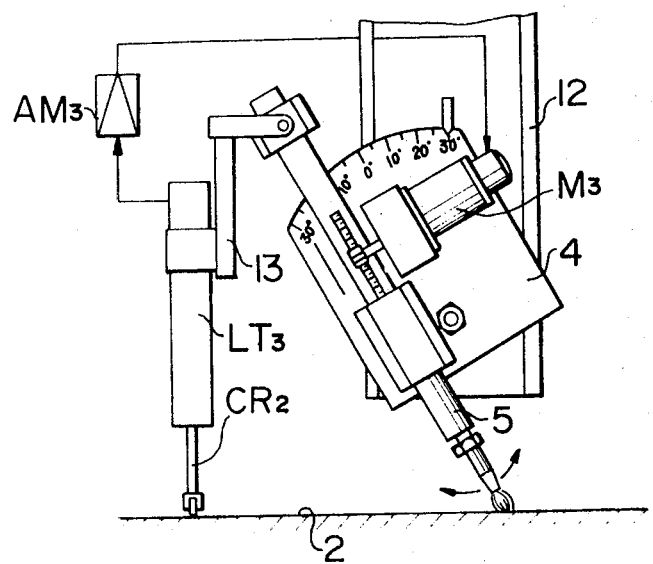
Figure 5:
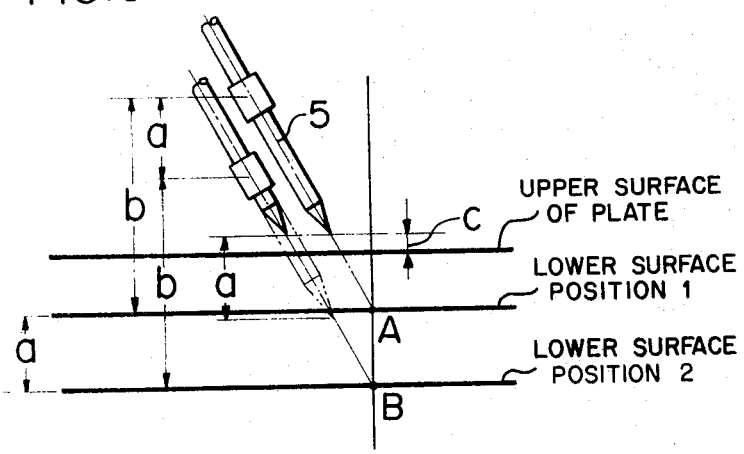
FIG. 5 is a diagram showing the amounts of vertical displacement of the torch position, which is useful for explaining the operation of the apparatus shown in FIGS. 3 and 4.

FIGS. 3 and 4 illustrates another embodiment of the present invention in which the torch is moved in the vertical direction with respect to the direction of movement thereof to thereby attain the same result as obtained by the arrangement described above. In this embodiment, the torch holder 4 is attached to the floating plate 12 to provide a given torch beveling angle and a differential transformer $LT_2$ is employed in place of the synchro control transmitter CX, whereby the floating plate 12 is controlled by the motor $M_2$ to remain at a predetermined distance from the bottom of a plate to be cut. In this case, however, the distance between the torch 5 and the upper surface of the plate tends to deviate from a predetermined value according to variations in the thickness of the plate. That is, as will be seen from FIG. 5, when the thickness of the plate increases by an amount $a$ and thus the bottom of the plate changes to the position 2 from the position 1, the differential transformer $LT_2$ causes the motor $M_2$ (FIG. 3) to lower the torch holder 4 by the distance $a$, thereby always maintaining the torch head at a predetermined distance $b$ from the bottom of the plate. In this case, however, the torch 5 is also lowered by the same distance $a$. To avoid this, as shown in FIG. 4, a differential transformer $LT_3$ is connected to the torch 5 by a connecting arm 13 so that the output voltage of the differential transformer $LT_3$ is applied to a motor $M_3$ through an amplifier $AM_3$ to thereby operate the torch and the differential transformer by means of a motor $M_3$. In other words, the torch 5 is moved upward on the torch holder 4 by the vertical distance $a$ and in this manner the distance between the torch 5 and the upper surface of the plate can be maintained at the initially set proper torch distance $c$, thereby always aligning the beveled edge portions A and B so that they extend in a straight line.

It will thus be seen that according to the present invention, the torch is moved horizontally or vertically in accordance with variations in the thickness of a plate to be cut and in this manner the beveled edge is aligned to extend in a straight line, thereby considerably improving operating efficiency and accuracy.

We claim:

1. A heavy plate cutting apparatus comprising:
a floating carriage movably supported above a steel plate to be cut,
a floating arm and a plate cutting torch attached to said floating carriage,
plate thickness detecting means mounted on one end of said floating arm and extending below the lower surface of said plate, and
torch controlling means responsive to output signals of said plate thickness detecting means for moving said torch in a direction which is substantially perpendicular to the direction of movement of said torch during a cutting operation, whereby the beveled edge of said steel plate extends in a straight line.

2. A heavy plate cutting apparatus according to claim 1, wherein said floating carriage includes a floating plate vertically movably attached at a portion thereof, and said floating arm and said plate cutting torch are attached to said floating plate.

3. A heavy plate cutting apparatus according to claim 1, wherein a differential transformer including a detecting roller placed in contact with the upper surface of the steel plate is mounted on said floating arm, and said apparatus includes an amplifier and a motor coupled to said floating arm, output voltages of said differential transformer being applied to said motor through said amplifier for vertically moving said floating arm to thereby vertically move said plate cutting torch.

4. A heavy plate cutting apparatus according to claim 1, wherein said plate thickness detecting means comprises a detecting roller normally placed in contact with the lower surface of the steel plate by a spring, and a synchro control transmitter operatively associated with said detecting roller, output signals responsive to variations in the thickness of the plate being supplied to said torch controlling means.

5. A heavy plate cutting apparatus according to claim 1, wherein said torch controlling means comprises a synchro control transformer, a motor and a torch displacement setting means mounted on said floating carriage, and an amplifier provided between said synchro control transformer and said motor, said torch being moved in accordance with output signals from said plate thickness detecting means.

6. A heavy plate cutting apparatus comprising:
a floating plate vertically movably supported above a steel plate to be cut,
a floating arm attached to said floating plate and having one end thereof extending below the lower surface of said plate,
plate thickness detecting means comprising a detecting roller normally placed in contact with the lower surface of said steel plate and a first differential transformer operatively associated with said detecting roller,
a torch holder attached to the lower end of said floating plate with a given torch beveling angle and carrying a torch,
means responsive to said plate thickness detecting means for vertically moving said torch,
a second differential transformer connected to said torch and having a detecting roller adapted to be placed in contact with the upper surface of said steel plate, and
a first motor coupled to said second differential transformer and to said torch for adjusting the position of said torch, whereby said torch is moved vertically in accordance with output signals of said plate thickness detecting means and at the same time output voltages of said second differential transformer which is connected to said torch are applied to said first motor to adjust in the vertical direction the positions of said torch and said second differential transformer.

7. A heavy plate cutting apparatus according to claim 6, wherein said means for vertically moving said torch includes a second motor responsive to the output of said plate thickness detecting means for moving said torch holder in the vertical direction.

8. A heavy plate cutting apparatus according to claim 6, wherein said first motor is mounted on said torch holder and said torch is adjustably mounted on said torch holder.

9. A heavy plate cutting apparatus according to claim 1, wherein said torch controlling means moves said torch transversely with respect to the direction of movement of said torch during the cutting operation.

10. A heavy plate cutting apparatus according to claim 1, wherein said torch controlling means moves said torch vertically with respect to the direction of movement of said torch during the cutting operation.

11. A heavy plate cutting apparatus according to claim 5, wherein said torch displacement setting means comprises a stepless speed change gear.

* * * * *